C. H. PRINCE.
METAL WORKING SHEARS.
APPLICATION FILED MAY 1, 1912.

1,046,852.

Patented Dec. 10, 1912.

WITNESSES

INVENTOR
Charles H. Prince
BY
ATTORNEYS

UNITED STATES PATENT OFFICE.

CHARLES H. PRINCE, OF NEW YORK, N. Y.

METAL-WORKING SHEARS.

1,046,852.  Specification of Letters Patent.  Patented Dec. 10, 1912.

Application filed May 1, 1912. Serial No. 694,458.

*To all whom it may concern:*

Be it known that I, CHARLES H. PRINCE, a citizen of the United States, and a resident of the city of New York, Long Island City, borough of Queens, in the county of Queens and State of New York, have invented new and Improved Metal-Working Shears, of which the following is a full, clear, and exact description.

My invention relates generally to shears, and, more particularly, it is directed to a new and improved form especially adapted for efficient use in metal-working.

The principal object of my invention is to provide a pair of metal-working shears of compound leverage, the construction and arrangement being such that the handle levers of the shears are prevented from working loose, being pivotally mounted in housings carried by the blade ends, as will be more particularly described and pointed out in the following specification.

Reference is to be had to the accompanying drawings forming part of this specification, in which similar characters of reference denote corresponding parts in all the views, and in which—

Figure 1:
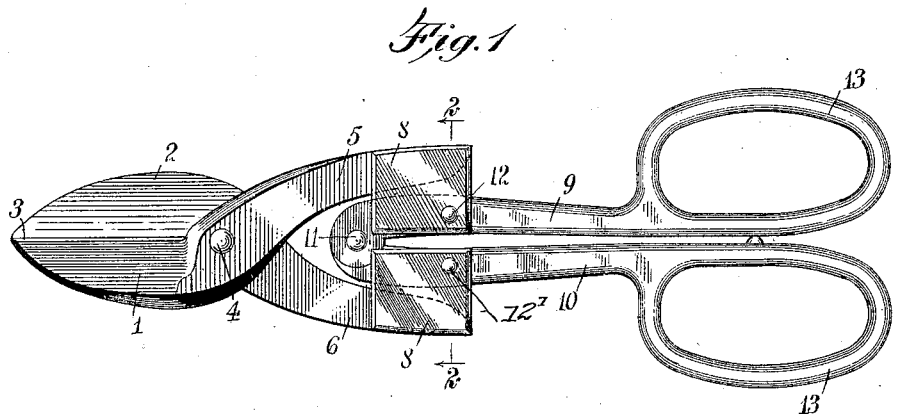
Figure 2:
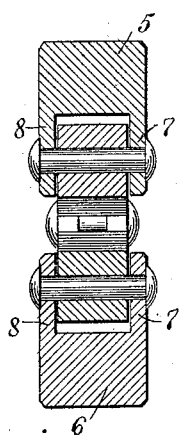

Figure 1 is a side view of the shears in closed position; Fig. 2 is a vertical sectional view on the line 2—2 of Fig. 1.

The shears comprise the blades 1, 2, provided with coöperating cutting edges 3, the blades being of the formation particularly shown in Fig. 1 and being in pivotal relation by means of a bolt or pin 4 engaging the blades intermediate their ends.

The inner ends 5, 6, of the blades are divergent, and at each inner end is a housing which is made up of the side walls 7, 8, which side walls are preferably integral with the blades, although the structure may be made of separate pieces and held together in any desirable manner. It will be noted that these side walls 7, 8, are suitably spaced and the handles 9, 10, of the shears, which are pivoted together at 11, pass between these side walls, one handle 9 being in pivotal engagement with one pair of side walls by means of a pin or pivot 12, the other handle 10 being in pivotal engagement with the other side walls or those carried by the blade 6 by means of a pin or pivot 12′.

Due to the fact that a plurality of levers are used, the shears are capable of exerting great pressure on material positioned between their cutting edges, the blades of the shears being always maintained in proper spaced relation with respect to the handles because of the housings made up of the said side walls 7, 8.

Due to the fact that the distance between the pivot 11 and either of the pivots 12 or 12′ is considerably less than the distance between this same pivot 11 and the loops 13, which receive the hand, the mass of the blades 1 and 2 tends to loosen the pivots 12, 12′, thereby rendering such shears less effective. By providing these extended side walls 7, 8, the mass of the blades is not carried directly on the pivots 12, 12′ but is distributed over the side walls of the housings, whereby a more efficient, compact, and serviceable construction is provided.

Having thus described my invention, I claim as new, and desire to secure by Letters Patent:—

A tool comprising a plurality of elements in pivotal relation with each other at a point intermediate the ends of each, the inner ends of the elements being divergent, a housing made up of separate side walls spaced apart and carried at the inner ends and on both sides of the elements, the side walls carried by one element extending toward the side walls carried by the other element, a plurality of handles in pivotal relation with each other, the said handles entering between the side walls of the said housings, one of the handles being in pivotal engagement between one pair of side walls, the other handle being in pivotal engagement between the other pair of side walls, the pivotal engagement of the handles with each other being between the pivotal mounting of the elements and the points of pivotal engagement of the handles with the said housings, whereby the extended bearing surfaces of the side walls of the housings on the handles provide a substantially rigid structure.

In testimony whereof I have signed my name to this specification in the presence of two subscribing witnesses.

CHAS. H. PRINCE.

Witnesses:
 MAGNUS LARSEN,
 E. C. BOONE.

---

Copies of this patent may be obtained for five cents each, by addressing the "Commissioner of Patents, Washington, D. C."